United States Patent [19]

Wijeyesekera et al.

[11] Patent Number: 6,032,102
[45] Date of Patent: Feb. 29, 2000

[54] METHOD AND APPARATUS FOR MEASURING WELL CHARACTERISTICS AND FORMATION PROPERTIES

[75] Inventors: Nihal I. Wijeyesekera, Stafford; Hugh D. Scott, Katy, both of Tex.

[73] Assignee: Schlumberger Technology Corporation, Houston, Tex.

[21] Appl. No.: 09/120,255

[22] Filed: Jul. 21, 1998

Related U.S. Application Data

[60] Provisional application No. 60/054,293, Jul. 31, 1997.
[51] Int. Cl.[7] .................................................... G06F 17/00
[52] U.S. Cl. .................................................................. 702/8
[58] Field of Search ................................ 702/8; 250/265, 250/269.4, 269.5, 269.6, 269.7, 269.8, 264

[56] References Cited

U.S. PATENT DOCUMENTS

| | | |
|---|---|---|
| 3,818,225 | 6/1974 | Smith ........................................ 250/264 |
| 3,979,300 | 9/1976 | Paap et al. .............................. 250/265 |
| 4,625,110 | 11/1986 | Smith, Jr. .............................. 250/269.4 |
| 4,638,161 | 1/1987 | Smith, Jr. et al. ................... 250/269.4 |
| 4,760,252 | 7/1988 | Albats et al. . |
| 4,972,082 | 11/1990 | Loomis et al. . |
| 5,051,581 | 9/1991 | Hertzog et al. . |
| 5,235,185 | 8/1993 | Albats et al. . |
| 5,349,184 | 9/1994 | Wraight . |
| 5,699,246 | 12/1997 | Plasek et al. . |

*Primary Examiner*—Donald E. McElheny, Jr.
*Attorney, Agent, or Firm*—John J. Ryberg; Brigitte L. Jeffery; Victor H. Segura

[57] ABSTRACT

The present invention provides for method and an apparatus for determining the porosity of a geological formation surrounding a cased well. The method further comprises of generating neutron pulses that release neutrons into an area adjacent the well, from a neutron source. Neutrons are sensed and a plurality of neutron detector count rates is acquired using at least two neutron source to neutron detector spacings. A timing measurement is acquired at one of the spacings to measure a first depth of investigation. A ratio of the neutron detector count rates is acquired to measure a second depth of investigation. An apparent porosity is calculated using the timing measurements and the ratios of neutron count rates. The effect of a well casing on the calculated apparent porosity is determined in response to at least one of the ratio of neutron detector count rates and the timing measurement. A cement annulus is computed based on the ratios of neutron count rates and the timing measurement. A formation porosity is calculated by performing a correction to the apparent porosity for the casing and the cement annulus.

26 Claims, 8 Drawing Sheets

METHOD AND APPARATUS FOR MEASURING WELL CHARACTERISTICS AND FORMATION PROPERTIES

CROSS-REFERENCES

The present application claims the benefit of U.S. Provisional Application No. 60/054,293 filed Jul. 31, 1997.

BACKGROUND OF THE INVENTION

1. Field of the Invention

This invention relates generally to measuring formation porosity, and, more specifically, to compensating a porosity measurement obtained in a cased hole for environmental effects, including cement thickness.

2. Description of the Related Art

Innovations in the science and the art of determining the characteristics of underground geological formations have produced many advanced methodologies for the study of hydrocarbon formations. Generally, well-logging tools are passed through boreholes that are surrounded by the geological formation of interest. A source located on the well-logging tool would then irradiate the formation. Sensors strategically spaced from the source are arranged on the well-logging tool. The sensors on the well-logging tool then detect the radiation intensity or the radiation decay rate that are generally indicative of the characteristics of the geological formation that was subjected to the radiation.

Currently, the state-of-the-art method for studying geological formations, formation porosity in particular, which surround a cased borehole, is the compensated thermal neutron tool (CNL) method. Generally, the CNL tool consists of a continuous neutron source and two neutron detectors. The neutron tool bombards the cased borehole and its surrounding formation with neutrons. The sensors on the CNL tool, located at two pre-selected spacing distances from the source, then detect the neutrons. The measurement data acquired by the sensors are then processed to study the porosity of the geological formation surrounding the cased borehole. The sensors primarily measure thermal neutrons. Due to the interaction between hydrogen and neutron, the neutrons that are captured provide some indication of the porosity of the surrounding geological formation.

One of the problems in employing CNL tools in cased boreholes relates to the fact that CNL tools detect thermal neutrons. There are multiple factors in cased boreholes that facilitate thermal neutron absorption. One such factor is chlorine in the saltwater that is used in cementing the casing. The chlorine in the saltwater can function as a thermal neutron absorber. Another such factor is the absorption of thermal neutrons by the steel casing in cased wells. The absorption of the thermal neutrons tends to dilute the accuracy of the data derived from the source measurements, which can cause the formation porosity measurement to become more qualitative.

Another problem with employing the CNL tool in cased boreholes is the fact that, in the steps relating to the processing of data acquired, the cement annulus of the cased borehole is assumed to be a known factor. In many cases, the cement thickness in cased boreholes is not accurately known. This is particularly true since a certain amount of cement is simply poured around the casing of the borehole. Many assumptions regarding the thickness of the cement annulus are not accurate. Therefore, the formation porosity data that is computed using a CNL tool can be compromised due to the inaccuracies of the estimation of the cement thickness of the cased borehole.

Another well-logging tool, the Accelerator Porosity Sonde (APS), is a state-of-the-art tool that is utilized in open boreholes. The APS uses an electronic accelerator generator instead of a continuous neutron source. The APS tool generally consists of a neutron source, a neutron sensor that is positioned at a near proximity from the neutron source, a set of array sensors positioned at an intermediate proximity from the neutron source, and a neutron sensor positioned at a far proximity from the neutron source. The APS provides three different porosity measurements and a formation sigma measurement. The APS comprises a neutron source that is capable of generating pulsed neutron outputs, which allows sigma and neutron slowing-down time measurements to be made. Due to the higher neutron yield that is made possible by the APS tool, epithermal neutron measurements become more viable.

The use of epithermal neutron detection substantially reduces the effects of possible thermal neutron absorbers in the formation, providing more accurate data regarding the formation porosity. Furthermore, application of APS in an open borehole generally includes a tool standoff. Due to the relatively shallow depth of investigation that corresponds to the slowing-down time analysis, tool standoff greatly affects the measurements. The tool standoff effects must be taken into account when the formation porosity is computed. A combination of the neutron count rate ratios and the slowing-down time measurements are utilized to reduce the effects of tool standoff. Although an APS tool application has a number of advantages over a CNL tool application, the APS is currently only adapted for open borehole analysis.

The present invention is directed to overcoming, or at least reducing the effects of, one or more of the problems set forth above.

SUMMARY OF THE INVENTION

The present invention provides for a method for determining the porosity of a geological formation. The method in the present invention further includes generating neutron pulses that release neutrons into a first region and the geological formation surrounding the first region. Neutrons are sensed and a plurality of neutron detector count rates are acquired using at least two neutron source to neutron detector spacings. A timing measurement is acquired at one of the spacings to measure a first depth of investigation. A ratio of the neutron detector count rates is acquired to measure a second depth of investigation. An apparent porosity is calculated using at least one of the timing measurements and the ratios of neutron count rates. The effect of the first region on the calculated apparent porosity is calculated, in response to at least one of the ratio of neutron detector count rates and the timing measurement. A formation porosity is calculated by performing correction to the apparent porosity for the determined effect of the first region.

The present invention also provides for an apparatus for acquiring data relating to well characteristics and geological formations comprising. The apparatus in the present invention includes a housing. A neutron source located in the housing is adapted to deliver neutrons into an area adjacent the well. The apparatus further comprises a means for generating neutron pulses through the neutron source. A first epithermal neutron sensor is located in the housing and spaced from the neutron source. The apparatus further comprises a means for acquiring a far neutron count rate through the first epithermal neutron sensor. A second epithermal neutron sensor located in the housing, spaced from the neutron source and intermediate the neutron source and the first epithermal neutron sensor. The apparatus further comprises a means for acquiring a near neutron count rate through the second epithermal neutron sensor. A third epithermal neutron sensor located in the housing intermediate the first and second epithermal neutron sensors. The apparatus further comprises a means for acquiring an array neutron count rate through the third epithermal neutron sensor. The apparatus further comprises a means for receiving electrical signals from the first, second, and third epithermal neutron sensors indicative of the number of neutrons detected by the sensors. The apparatus further comprises a means for acquiring a timing measurement from at least one of the near neutron sensor, array neutron sensor, and far neutron sensor to measure a first depth of investigation. The apparatus further comprises a means for acquiring at least one of a ratio of the near neutron count rate to the array neutron count rate and ratio of the near neutron count rate to the far neutron count rate, to measure a second depth of investigation. The apparatus further comprises a means for calculating a porosity of the area adjacent the well using at least one of the timing measurements and at least one of the ratio the near neutron count rate to the array neutron count rate and ratio of the near neutron count rate to the far neutron count rate.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

There are many factors involved in computing the potential production of oil and gas from a geological formation. One significant factor in computing potential production of oil and gas is the porosity of the formation surrounding an oil and gas well, hereinafter well. The porosity of geological formations relates to the amount of interstitial space in the materials around the well. Many cased wells exist for which the formation porosity is not well known. Therefore, an Accelerator Porosity Sonde (APS), mark of Schlumberger, which uses an electronic accelerator neutron generator, used in open boreholes to determine the porosity in geological formations, has been adapted to also measure formation porosity in cased and cemented boreholes.

Figure 1:
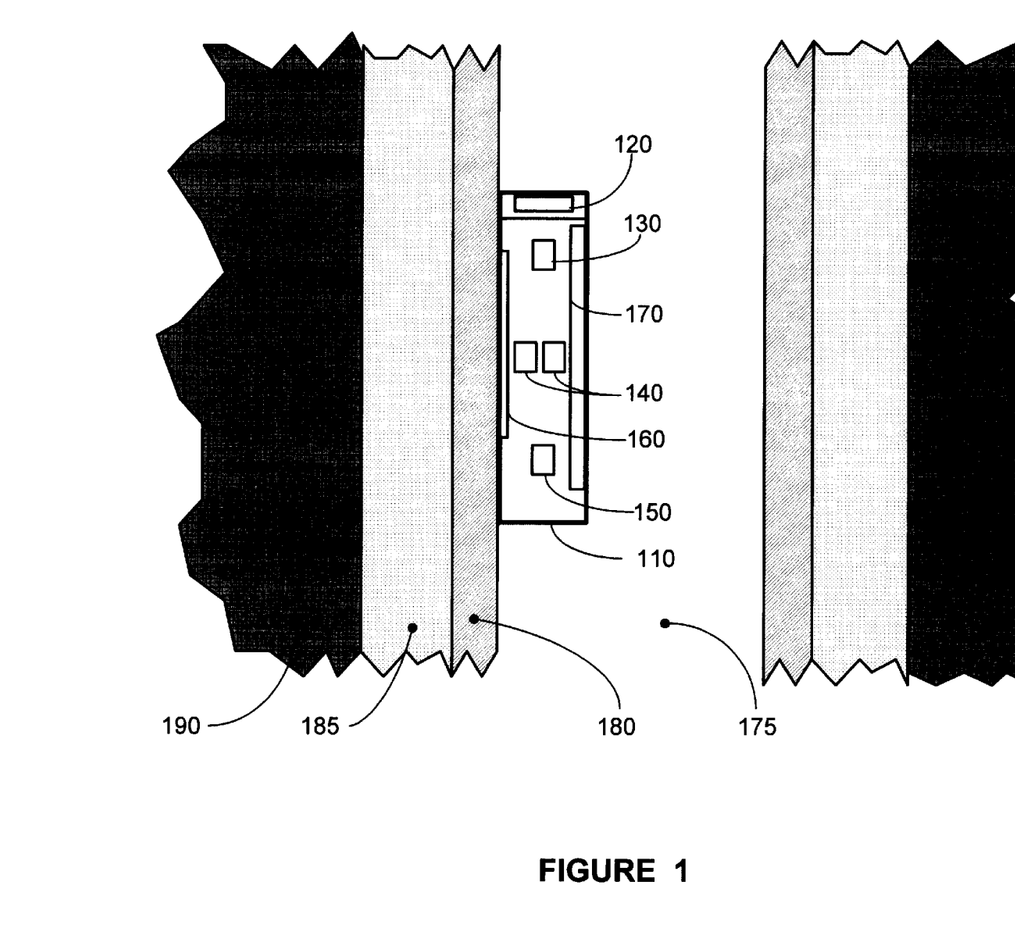
FIG. 1 illustrates a diagram of one embodiment of an apparatus for the present invention.

Turning now to FIG. 1, one embodiment of the present invention, a diagram of a neutron based well-logging tool 110, is shown. The neutron based well-logging tool 110 includes a conventional neutron source 120 that is capable of generating neutron pulses. The neutron pulses that are generated by the neutron based well-logging tool 110 include pulses that are 10 microseconds wide. The neutron based well-logging tool 110 also includes three epithermal neutron sensors, or neutron detectors 130, 140, 150. One epithermal neutron sensor is located immediately below the neutron source 120 and is called the near epithermal neutron sensor 130. The near epithermal neutron sensor 130, in one embodiment, could be comprised of multiple epithermal neutron sensors that are arranged in such a fashion as to effectively act as a single neutron sensor.

Another set of epithermal neutron sensors, which are mounted at the same elevation in one embodiment, are located below the near epithermal neutron sensor 130 and further away from the neutron source 120, and are called array (or intermediate) sensors 140. In an alternative embodiment, a single epithermal neutron sensor could be used in place of the array sensors 140. Another epithermal neutron sensor, the far epithermal neutron sensor 150 is located below the array sensors 140 and is the furthest away from the neutron source 120.

The neutron based well-logging tool 110 also includes electronic circuitry 160 which electronically interfaces with the near epithermal neutron sensor 130, the array sensors 140, and the far epithermal neutron sensor 150, and collects data acquired from the neutron sensors 130, 140, 150. The neutron based well-logging tool 110 also includes a back-shielding material 170 that focuses the detection of the neutron sensors 130, 140, 150. The data acquired by the neutron based well-logging tool 110 is sent back to a surface electronic circuitry (not shown) for data collection and further data processing. The data acquired by the neutron based well-logging tool 110 is used to compute the porosity of the geological formation surrounding the well under investigation, as well as to compute certain other characteristics of a cased well, such as the cement annulus. In an alternative embodiment, a neutron based well-logging tool 110 employs two, or two sets of, epithermal neutron sensors instead of three sets of epithermal neutron detectors. The additional set of neutron sensors in the illustrated embodiment provides another depth of investigation, resulting in greater accuracy of the data acquired.

FIG. 1 also illustrates the neutron based well-logging tool 110 being placed in a well borehole 175. The well borehole 175 is surrounded by casing materials, which in one embodiment is well-casing steel 180. The well-casing steel 180 is surrounded by the well-casing cement 185, which is surrounded by the underground formation 190.

Figure 2:
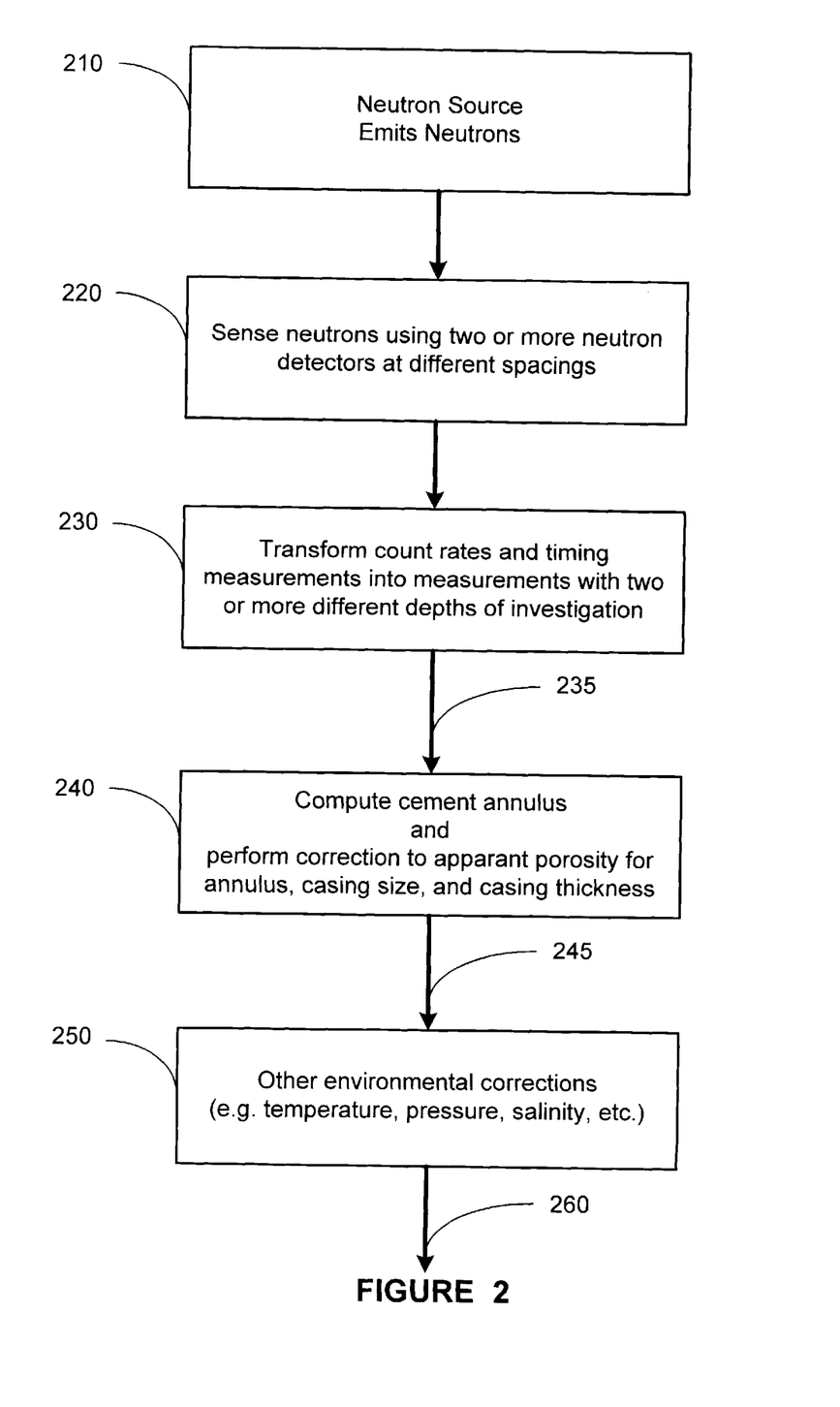
FIG. 2 depicts a block diagram that illustrates the method of one embodiment of the present invention.

Turning now to FIG. 2, a flow chart encompassing the primary methods of operating the present invention, is shown. Block 210 illustrates the initial step of the method prescribed by the present invention. The neutron source 120 emits neutron pulses at block 210. The neutrons emitted by the neutron source 120 traverse though the casing material and the geological formations surrounding the cased well. The neutron detectors employed by the present invention, the near epithermal neutron sensor 130, the array sensors 140, and the far epithermal neutron sensor 150, detect neutrons that are in the epithermal energy state, as shown in block 220. In one embodiment, the neutron sensors in the present invention are designed to filter out neutrons that reside in the thermal energy state, thereby only sensing neutrons that are in the epithermal energy state. Thermal neutrons are not sensed primarily because filtering out thermal neutrons enhances the accuracy of computations of the porosity of geological formations.

Figure 3:
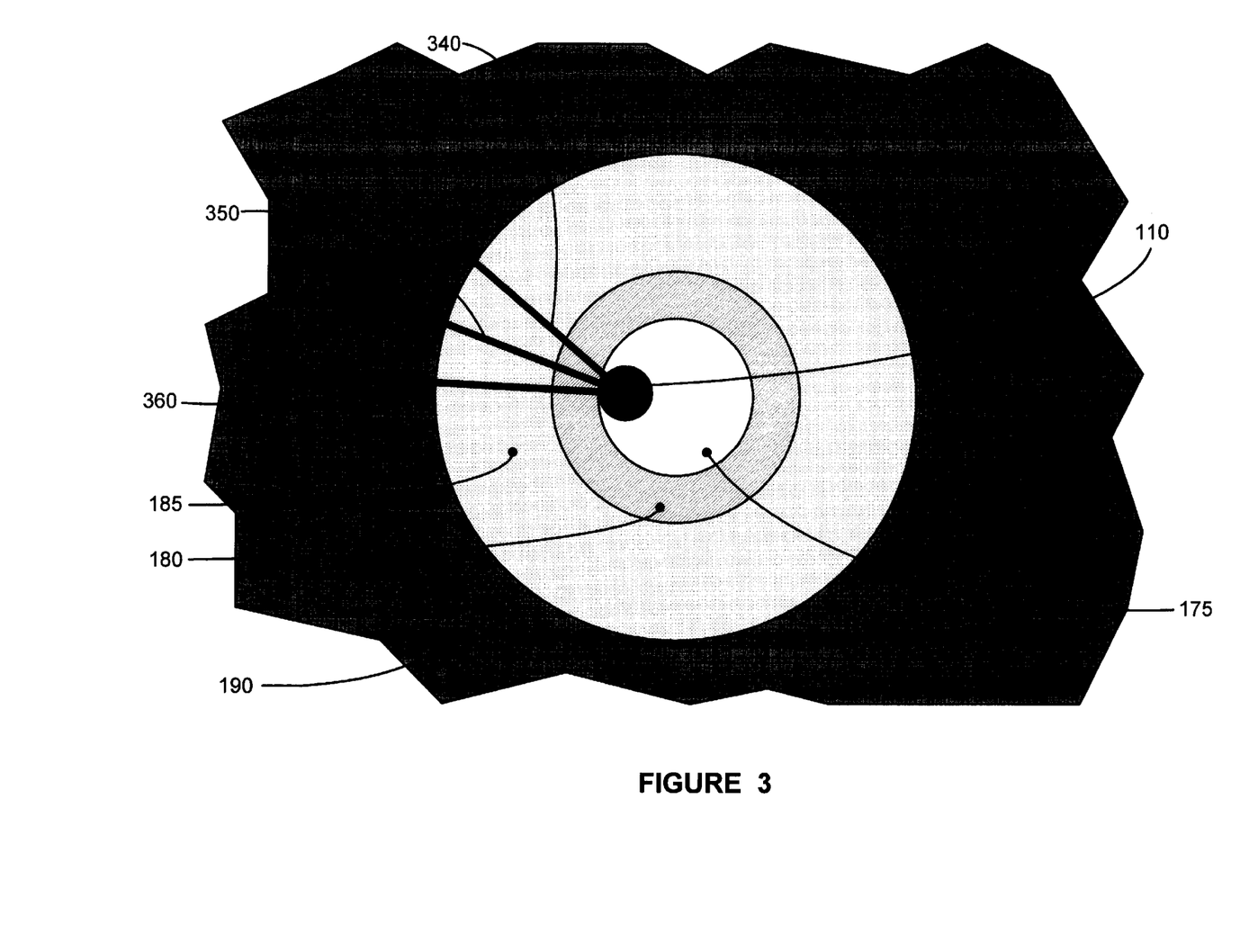
FIG. 3 depicts a diagram of one method of employing the present invention, shown from a perspective of viewing down a cased well, wherein multiple depths of investigations are illustrated.

After the neutron source 120 emits neutrons as shown in block 210, two or more neutron sensors 130, 140, 150, at different spacing, sense epithermal neutrons. In one embodiment, three sets of neutron sensors 130, 140, 150 are employed, as shown in FIG. 1. FIG. 3 illustrates a stylized top cross-sectional view of one embodiment of a cased well implementing the present invention. The neutron based well-logging tool 110 is placed in the well borehole 175. The well borehole 175 is surrounded by casing materials including the well-casing steel 180 and the well-casing cement 185, which are surrounded by the underground formation 190.

The near epithermal neutron sensor 130 produces a neutron count rate called the near neutron count rate (N). The array sensors 140 produce a neutron count rate called the array neutron count rate (A). The far epithermal neutron sensor 150 produces a neutron count rate called the far neutron count rate (F). The ratios of the near neutron count rate to the array neutron count rate (N/A) and the near neutron count rate to the far neutron count rate (N/F), produce two distinct depths of investigations.

The depth of investigation relates to how far from the neutron based well-logging tool 110 the neutron sensors analyze. The shallow depth of investigation 340 relates the slowing-down time analysis, which is discussed below. The intermediate depth of investigation 350 relates to the ratio of the near neutron count rate to the array neutron count rate (N/A). The deep depth of investigation 360 relates to the ratio of the near neutron count rate to the far neutron count rate (N/F).

Figure 4:
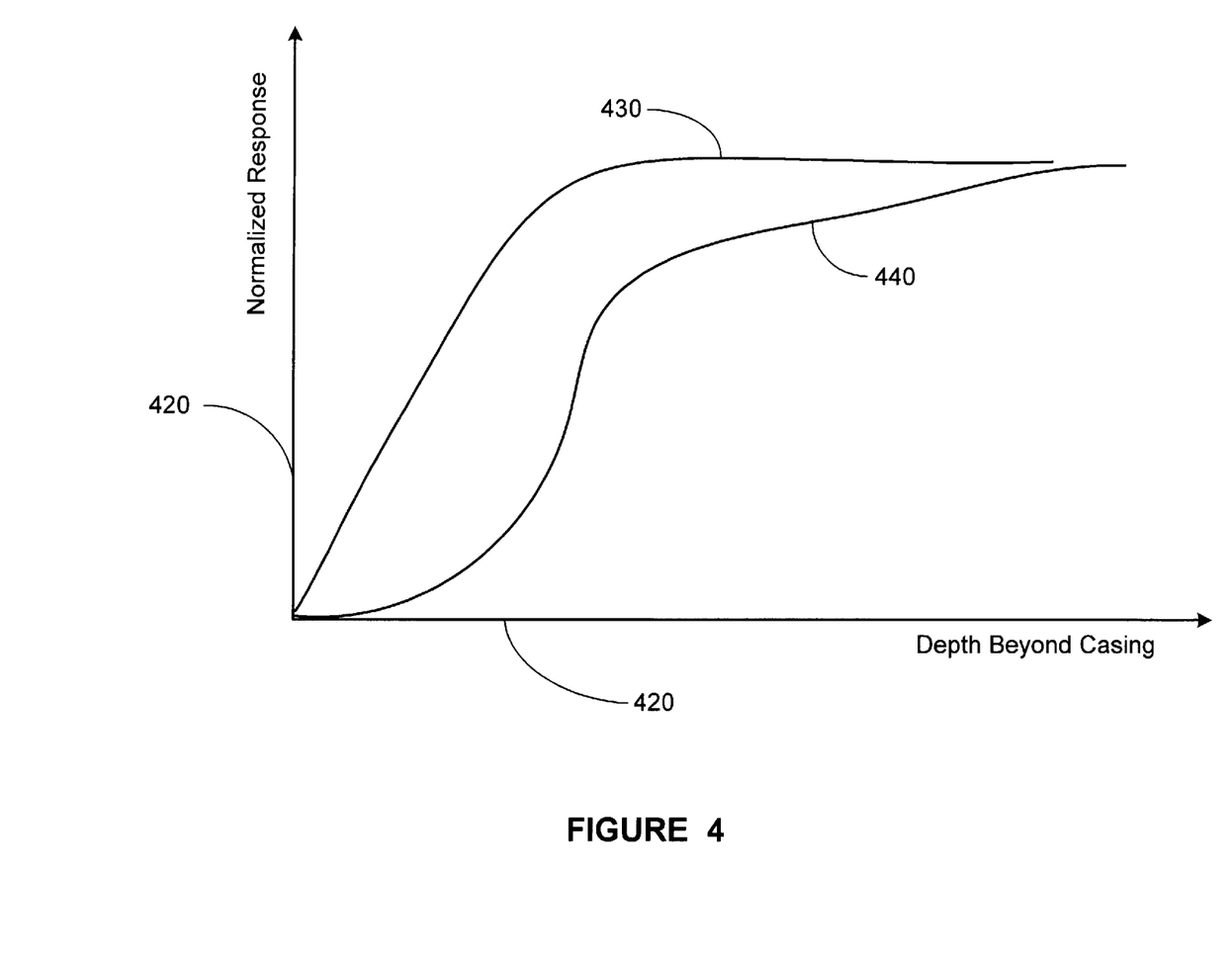
FIG. 4 depicts a diagram illustrating a graph that shows the relationship between two different depths of investigation.

FIG. 4 depicts a graph that illustrates the relationship between two different depths of investigation. The x-axis 410 is defined by the depth towards the formation, beyond the casing wall in a cased well. The y-axis 420 is defined by the normalized response of the measurements that correspond to the N/A ratio and the slowing-down time. The normalized response graph relating to the slowing-down time (SDT) is illustrated by SDT-curve 430. The normalized response graph relating to the N/A ratio is illustrated by N/A-curve 440. One with ordinary skill in the art would appreciate that, due to the relationship between the SDT-curve 430 and the N/A-curve 440, the slowing-down time analysis produces a more shallow depth of investigation than a the depth of investigation produced by the N/A ratio.

Focusing the neutron sensors further controls the multiple depths of investigation. The focusing of the neutron sensors is accomplished by back-shielding the three neutron sensors described in FIG. 1. The back-shielding of the three neutron sensors described in FIG. 1 causes the sensors 130, 140, 150 to focus in a direction that is in the opposite direction of the back-shielding, narrowing and focusing the shallow, intermediate, and deep depths of investigation 340, 350, and 360. Data acquired from the three different neutron sensors 130, 140, 150, provides information regarding the characteristics of the casing, cement, and the geological formations surrounding a cased well. The use of multiple computations with different inherent depths of investigation allows for more accurate corrections for variations in borehole environmental conditions, such as hole size, casing thickness, and cement thickness. These corrections are determined by combining the information from the three depths of investigation, with a database consisting of laboratory measurements and modeled results for several casing and borehole sizes in different formations.

Figure 5:
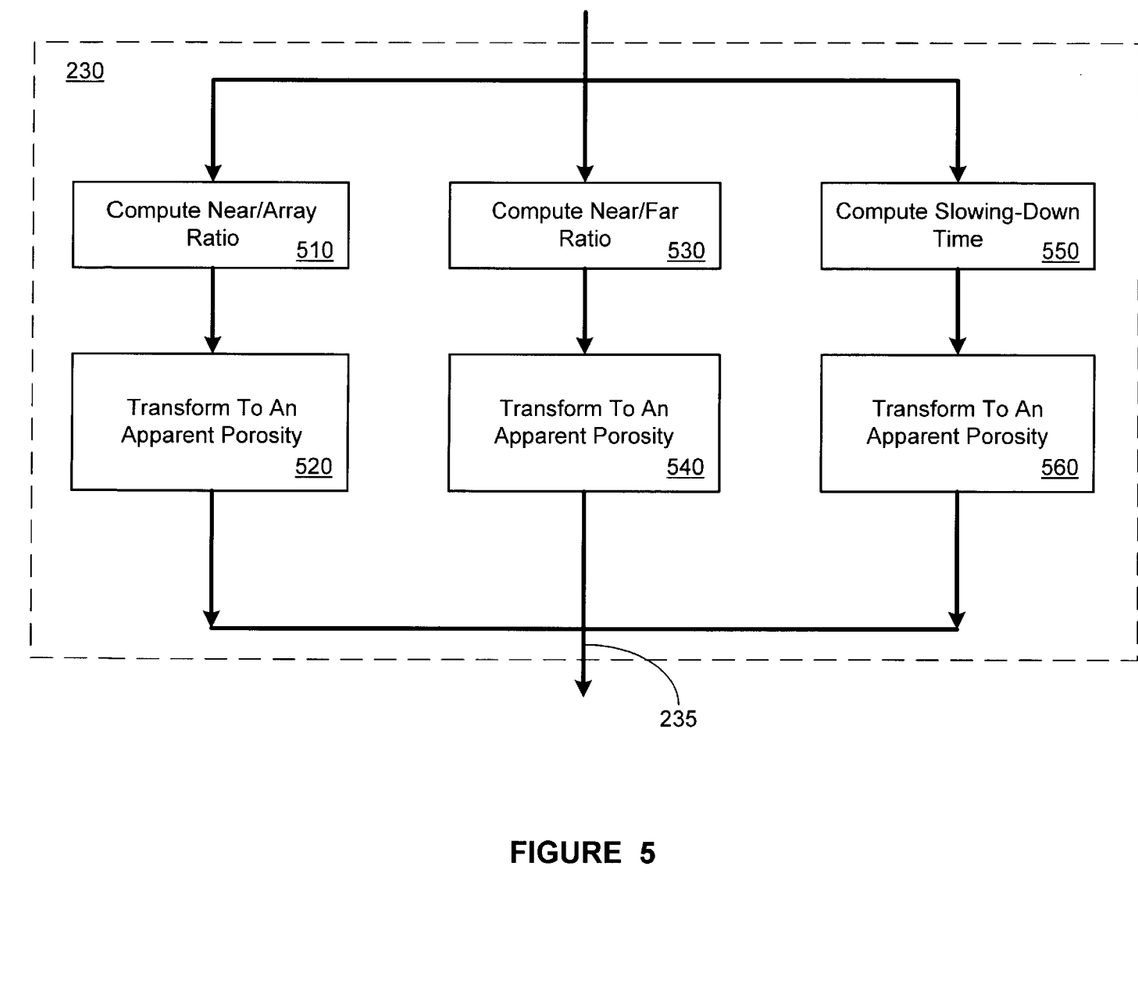
FIG. 5 depicts a block diagram that illustrates a more detailed representation of one of the steps (block 230) described in FIG. 2.

Turning back to FIG. 2, at block 230, the near, array, and far count rates (N, A, F), as well as the slowing-down time measurements, are transformed into three measurements with three different depths of investigation, namely the N/A ratio, the N/F ratio, and the slowing-down time (SDT). In one embodiment, these three measurements are further transformed into data that reflects the apparent porosity of the geological formation surrounding the well. The apparent porosity is the porosity indication of the nearby geological formation. FIG. 5 depicts a more detailed illustration of the step described at block 230 of FIG. 2.

The near, array and far count rates (N, A, F) are applied in ratios to compute the apparent porosity. A ratio of the near neutron count rate and the array neutron count rate (N/A) is computed at block 510. The N/A ratio results in the near-array apparent porosity, as shown at block 520. A ratio of the near neutron count rate and the far neutron count rate (N/F) is computed at block 530. The N/F ratio results in the near-far apparent porosity, as shown at block 540. The N/A ratio and the N/F ratio are produced because of the different spacings between the neutron source 120 and the neutron sensors 130, 140, 150.

Turning back to FIG. 5, another part of the computation of formation porosity includes computing a slowing-down time, as shown at block 550. Once the slowing-down time analysis is performed, the data is transformed into an apparent porosity at block 560. The slowing-down time provides a relatively shallow depth of investigation.

The transport of neutrons through the geological formation is controlled by the various atomic nuclei present in the formation, and their respective neutron scattering and absorption cross sections. The epithermal neutron slowing-down time is determined from an analysis of its population decay. Hydrogen is a significant element in the slowing-down process, particularly at low neutron energies. Elastic and inelastic scattering (which are apparent to those skilled in the art) from other elements are more significant at high neutron energies, and help determine the size of the neutron cloud, and, therefore, the neutron slowing-down distance in the formation.

Figure 6:
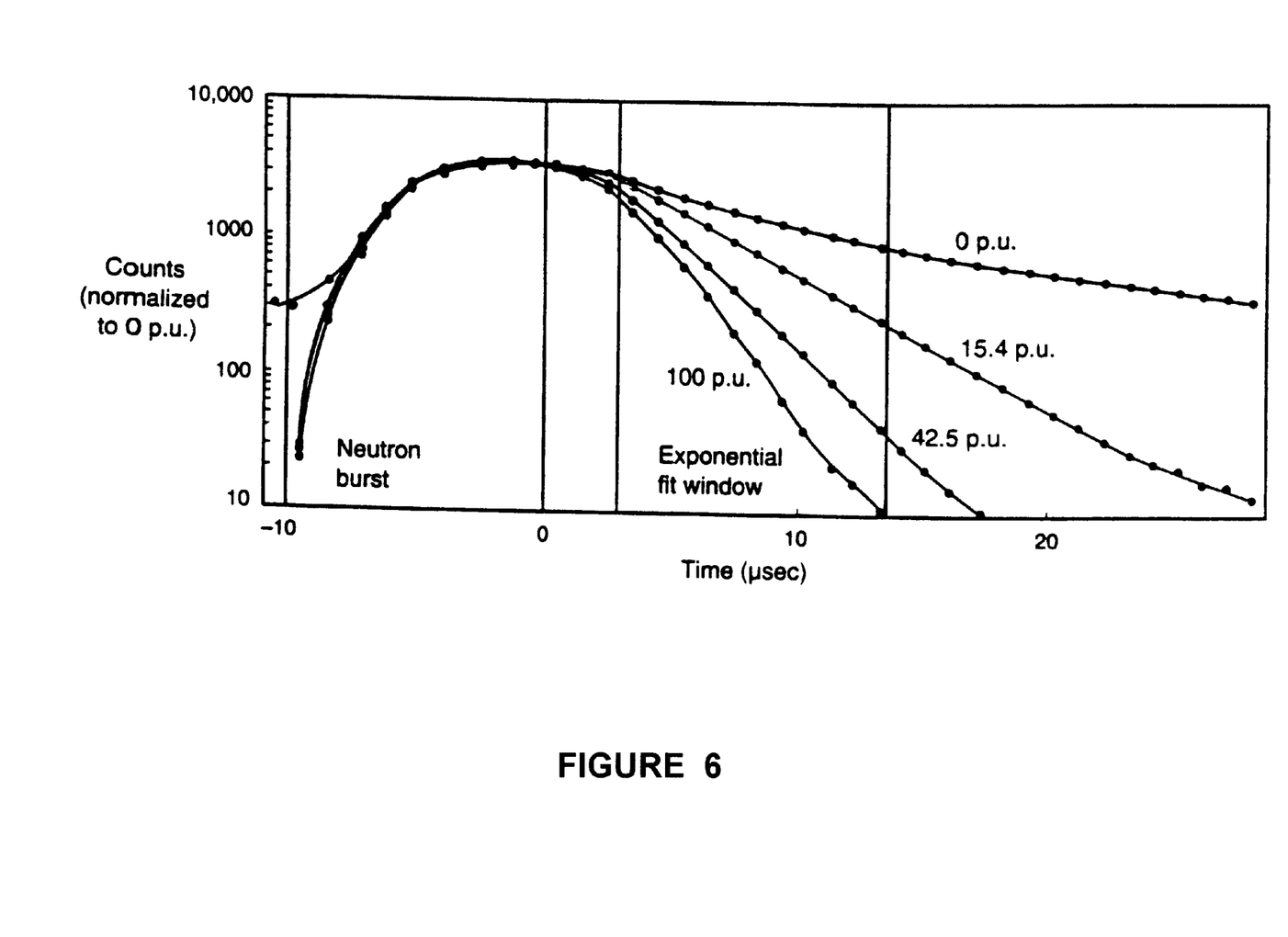
FIG. 6 illustrates the relationship between neutron count and time, as measured by the array epithermal neutron sensors.
Figure 7:
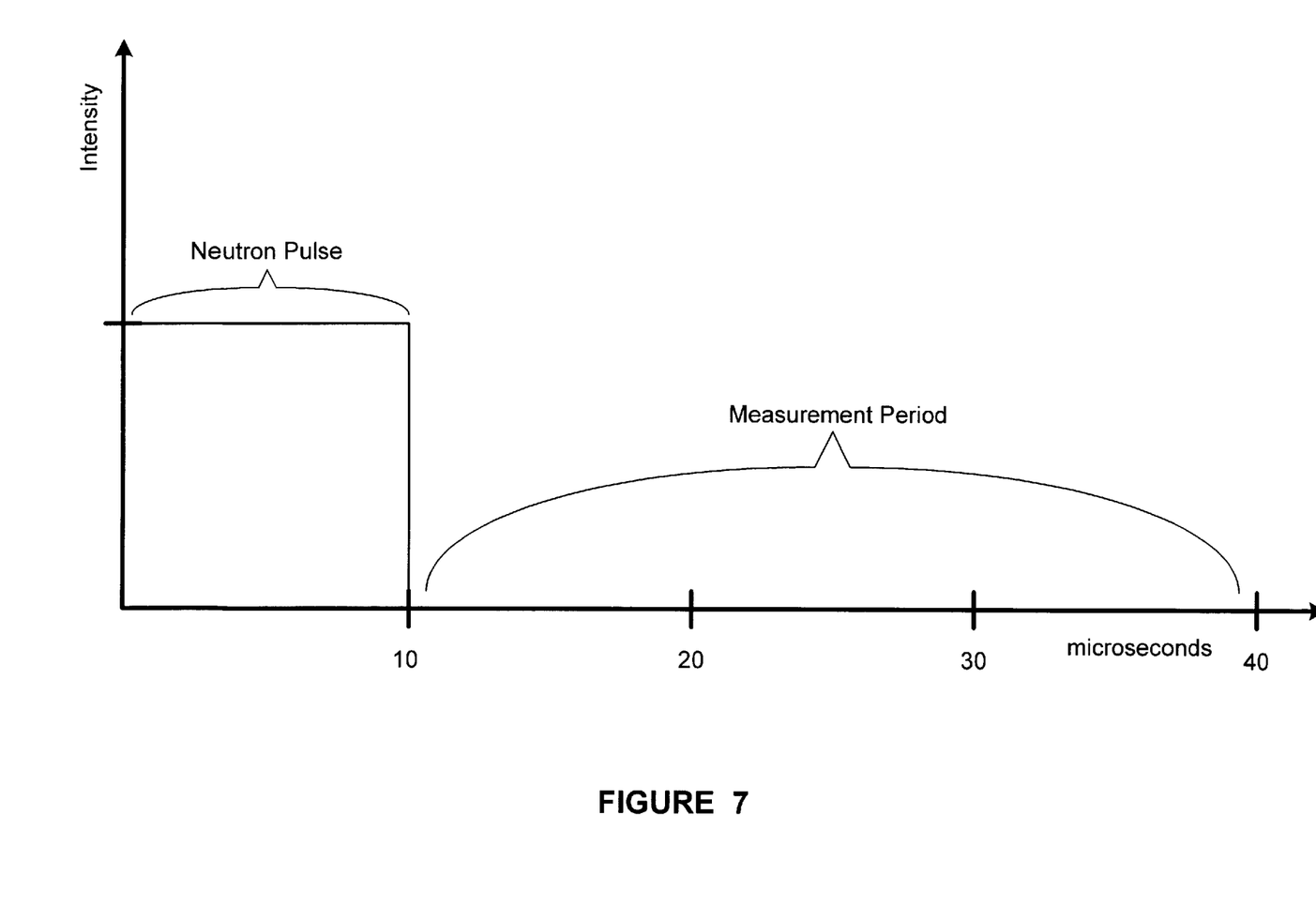
FIG. 7 illustrates a graph of the neutron pulse and the measurement period, as employed in one embodiment of the present invention.

FIG. 6 shows the epithermal neutron time distribution acquired during five minute periods in laboratory formations of zero-porosity, medium-porosity and high-porosity limestone with the logging tool carrying the neutron detectors (or sensors) fully eccentered in an 8" borehole and in an infinite water tank representing 100 p.u. The total epithermal neutron population decreases with increasing porosity. To facilitate comparison of the decay rates in the laboratory, all measurements were normalized to the count rate immediately after the neutron burst in the zero-porosity formation. Sensitivity of the decay rate to formation porosity is excellent at low to medium porosities with less sensitivity at higher porosities. The measurement is made with a 25 KHz repetition rate with neutron pulses that are 10-(sec (10 microseconds) long, followed by a 30-(sec observation period as illustrated by FIG. 7.

Figure 8:
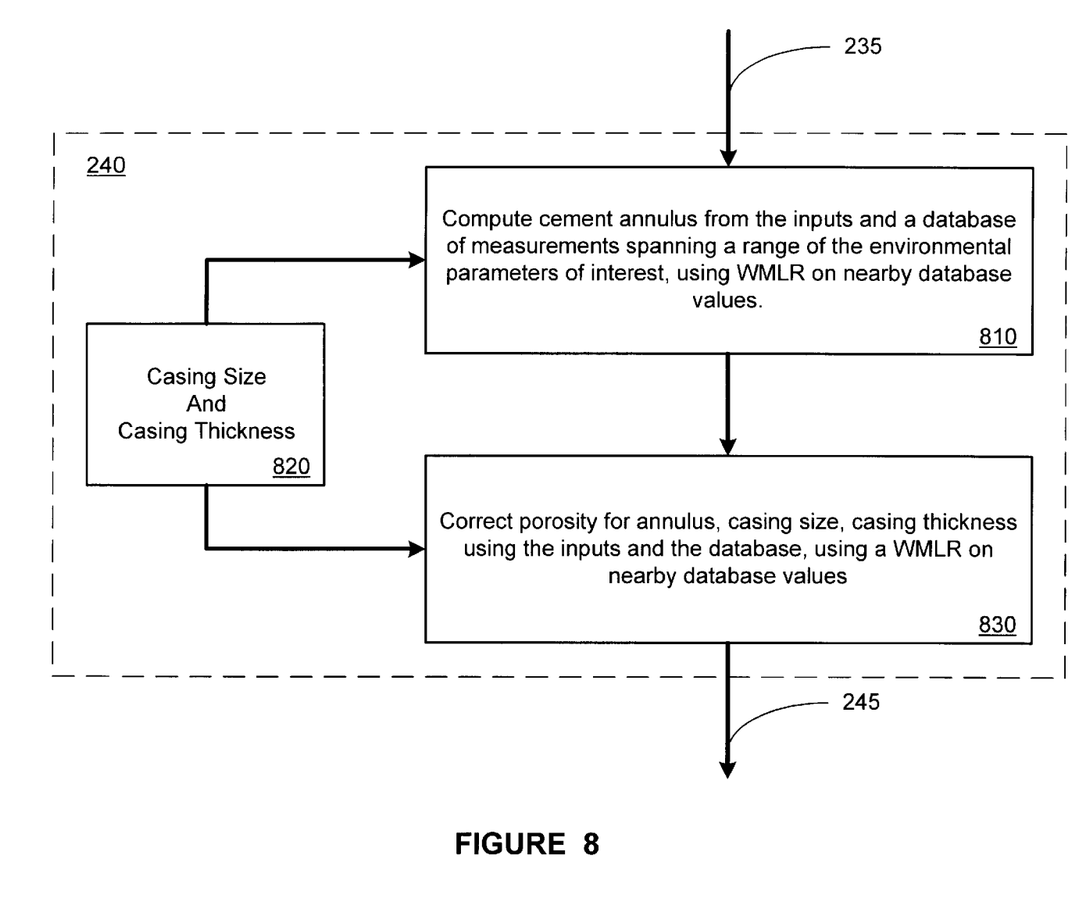
FIG. 8 depicts a block diagram that illustrates a more detailed representation of one of the steps (block 240) described in FIG. 2.

Referring back to FIGS. 2 and 5, at this point, the neutron count rates and slowing-down timing measurements are transformed into ratios and timing measurements that result in multiple depths of investigation. Also, an apparent porosity is computed for each of the three calculations (N/A ratio, N/F ratio, and slowing-down time) described in the present invention, as shown at block 230 in FIG. 2 and also shown in FIG. 5. The apparent porosities are shown on line 235 in FIG. 2. Subsequently, the cement annulus of the cased well is computed, and the apparent porosities computed from the neutron count rates and timing measurements are corrected for factors such as the cement annulus, casing size, and casing thickness, as described in block 240 in FIG. 2. FIG. 8 depicts a more detailed illustration of the steps described in block 240 in FIG. 2.

Turning now to FIG. 8, the apparent porosities computed from the N/A ratio, the N/F ratio, and the slowing-down time, along with the inputs from a large database of measurements spanning a range of the environmental parameters of interest, are used to compute the cement annulus, as shown at block 810. The cement annulus is computed using the aforementioned data sets and applying a weighted multiple linear regression (WMLR) technique on nearby database values, as shown at block 810. The known casing size and casing thickness are input into the computation of the cement annulus, and for the annulus correction computation, as shown at block 820. Upon completing the calculation of the cement annulus, the apparent porosity is corrected for the annulus, casing size and thickness, and information from the database, using a WMLR technique, as described at block 830 in FIG. 8.

One embodiment for applying the WMLR technique to compute the cement annulus, and another embodiment for applying the WMLR technique to correct for the casing size, casing hole and other database inputs, are described below.

The transformation from the neutron count rate ratios to apparent porosity (as depicted in blocks 520 and 540 of FIG. 5), as well as the transformation from the slowing-down time to apparent porosity (as depicted in block 560 of FIG. 5), in one embodiment, is performed by utilizing a polynomial-type relationship, which is determined from the tool response in a standard reference condition. This technique is well known to those skilled in the art and is commonly used in open hole neutron porosity measurement techniques. Furthermore, this technique is extendible to the cased hole environment. In one particular embodiment, a reference condition of 7" OD casing with 29 lb/ft casing centered in an 8.5" cased hole with fresh water in the borehole at room temperature and pressure is used.

Environmental corrections are then applied to take into consideration the difference in the tool response when not in the standard reference environment. The traditional approach to determining environmental corrections has been to develop specific equations that are functions of the apparent porosity and all the environmental parameters. The effects of each of the environmental parameters need not be independent of the others, and so the equations have to be multi-dimensional. Many of the environmental effects cannot easily be en-captured in direct analytical equations that are valid over the entire range of the environmental parameters encountered.

In one embodiment, neutron porosity measurement techniques utilize the above approach, developing corrections using a database of measurements spanning all the various environmental parameters of interest. In the cased hole environment, the number of parameters increases further, beyond the number of parameters used for open hole measurements, due to the presence of casing and cement. Variations in casing diameter, casing thickness, cement thickness, and cement type, are taken into consideration. Rather than including the additional environmental effects into analytical equations for performing the corrections, one embodiment for cased hole porosity determination applies a technique developed and described in U.S. Pat. No. 5,699, 246, which is hereby incorporated and referenced in its entirety. Using this approach, the relationship between the apparent porosities, the environmental parameters and the true quantities is dynamically determined using a Weighted Multiple Linear Regression (WMLR) on the nearby database values. This method simultaneously handles many of the required environmental corrections, and substantially avoids the difficulties encountered in the traditional fixed equation based approach.

The structure and terminology used in the WMLR method is based on the assertion that the value of a particular unknown "dependent" variable (e.g., formation porosity) is a function of a number of independent quantities, such as apparent porosities and casing parameters. The dependent quantity is usually some unknown formation or borehole characteristic, and the independent quantities are the different tool response measurements and environmental conditions. For the cased hole neutron porosity tool described in the present invention, the dependent variables are either the porosity correction, or the cement annulus. The independent variables are the apparent porosities (on line 235 of FIG. 2) from the N/A ratio, N/F ratio, and slowing-down time; and the environmental parameters are casing size and casing thickness, as shown in block 820 of FIG. 8.

The general relationship between the independent and dependent variables may be complex and hard to determine particularly when the number of independent variables is large. The tool response can be characterized by making a large number of laboratory measurements and by modeling the tool response in a variety of conditions. This database indirectly contains the information relating the tool response to the environmental conditions and the desired dependent variables. In a typical logging situation, at each depth (or observation point), a set of values of the independent variables is available, and the value of a corresponding dependent variable is desired. The WMLR method involves making the assumption that the dependent quantity will be closely related to the database points in the immediate vicinity of the observation. For example, the porosity of the observation point is related to the porosities of the database measurements nearest to the observation.

The dependent variable can then be expressed as some combination of its nearest neighbors. This procedure is formalized by the WMLR method as follows: Given a set of the independent variables for some observation, (1) determine the nearest neighbors in the database; (2) develop a simple model for the relationship between the dependent and independent variables in this neighborhood of the database; and (3) determine the value of the dependent variable for the particular observation by using the above model.

In one embodiment of the application of the cased hole neutron logging tool, the determination of the cement annulus and the correction for annulus, casing size and casing thickness can be performed using a single WMLR to get the corrected apparent formation porosity 245. In an alternative embodiment, described in FIG. 8, two separate WMLR methods are performed. The first WMLR is performed to compute the cement annulus, as described in block 810 of FIG. 8. Subsequently, the value derived from the first WMLR is used in a second WMLR, as shown in block 830. This provides a measurement of the volume of material in the annulus between the casing and the formation, which can be used as an indication of the quality of the formation porosity measurement. A large cement annulus will typically reflect less confidence in the accuracy of the correction since most of the neutrons will not reach the formation of interest, while a smaller cement annulus will indicate a more accurate correction for the annulus, and thus a more accurate measurement of formation porosity.

After computing the cement annulus and correcting the apparent porosity for annulus, casing size, casing thickness, and database information, as described at block 240, the apparent formation porosity is produced. The apparent formation porosity is shown on line 245 in FIG. 2.

The apparent formation porosity is then corrected for other environmental factors such as borehole temperature, pressure, and salinity, as described at block 250 of FIG. 2. Once the apparent formation is corrected for environmental factors, the result is a substantially accurate indication of the porosity of the geological formation surrounding the cased well, on line 260. The determination of the level of porosity in the geological formation surrounding a well is important. The level of porosity is an important factor that indicates the potential level of oil and gas production from a well. A high level of porosity generally indicates that the production of oil and gas would be higher.

It will be appreciated by those of ordinary skill in the art having the benefit of this disclosure that numerous variations from the foregoing illustration will be possible without departing from the inventive concept described herein. Accordingly, it is the claims set forth below, and not merely the foregoing illustration, which are intended to define the exclusive rights of the invention.

What is claimed:

1. A method for determining the porosity of a geological formation, comprising:

generating neutron pulses that release neutrons into a first region and the geological formation surrounding said first region;

sensing neutrons and acquiring a plurality of neutron detector count rates using at least two neutron source to neutron detector spacings;

acquiring a timing measurement at one of said spacings to measure a first depth of investigation;

acquiring a first ratio of said neutron detector count rates to measure a second depth of investigation;

calculating an apparent porosity using at least one of said timing measurements and said ratio of neutron count rates;

determining the effect of said first region on said calculated apparent porosity in response to at least one of said ratio of neutron detector count rates and said timing measurement;

calculating a formation porosity by performing correction to said apparent porosity for the determined effect of said first region.

2. The method as described in claim 1, wherein said step of generating neutron pulses that release neutrons into said first region comprises generating neutron pulses that release neutrons into a cement annulus in a cased well.

3. The method as described in claim 2, further including the step of acquiring a second ratio of said neutron detector count rates to measure a third depth of investigation, wherein said step of determining the effect comprises determining the effect of said cement annulus on said apparent porosity in response to said first and second ratios and said timing measurements.

4. The method as described in claim 2, wherein said step of generating neutron pulses that release neutrons into a first region comprises generating neutron pulses that release neutrons into said cement annulus and a casing in a cased well, further comprising the step of acquiring a second ratio of said neutron detector count rates to measure a third depth of investigation, and wherein said step of determining the effect comprises determining the effect of said casing and said cement annulus on said apparent porosity in response to said first and second ratios and said timing measurement.

5. The method as described in claim 1, wherein said step of generating neutron pulses that release neutrons into said first region comprises generating neutron pulses that release neutrons into a stand-off region in an open well.

6. The method as described in claim 5, wherein said step of generating neutron pulses that release neutrons into a first region comprises generating neutron pulses that release neutrons into said stand-off region and a mud-cake region in an open well, further comprising the step of acquiring a second ratio of said neutron detector count rates to measure a third depth of investigation, wherein said step of determining the effect comprises determining the effect of said stand-off region and said mud-cake region on said apparent porosity in response to said first and second ratios and said timing measurement.

7. A method for determining the porosity of a geological formation surrounding a cased well, comprising:

generating neutron pulses that release neutrons into an area adjacent said well, from a neutron source;

sensing neutrons and acquiring a plurality of neutron detector count rates using at least two neutron source to neutron detector spacings;

acquiring a timing measurement at one of said spacings to measure a first depth of investigation;

acquiring a ratio of said neutron detector count rates to measure a second depth of investigation;

calculating an apparent porosity using at least one of said timing measurements and said ratios of neutron count rates;

determining the effect of a well casing on said calculated apparent porosity in response to at least one of said ratio of neutron detector count rates and said timing measurement;

computing a cement annulus based on at least one of said ratios of neutron count rates and said timing measurement;

calculating a formation porosity by performing a correction to said apparent porosity for said casing and cement annulus.

8. The method as described in claim 7, wherein said step of sensing neutrons includes focusing said sensors towards a predetermined area.

9. The method as described in claim 7, wherein said step of calculating said neutron count rates includes:

obtaining a near neutron count rate;

obtaining an intermediate neutron count rate; and obtaining a far neutron count rate.

10. The method as described in claim 9, wherein said step of obtaining a near neutron count rate is performed by using a neutron sensor positioned at a near spacing from said neutron source.

11. The method as described in claim 9, wherein said step of obtaining an intermediate count rate is performed by using a neutron sensor positioned at an intermediate spacing from said neutron source.

12. The method as described in claim 9, wherein said step of obtaining a far neutron count rate is performed by using a neutron sensor positioned at a far spacing from said neutron source.

13. The method as described in claim 7, wherein said step of calculating timing measurements includes determining a time period needed for neutron count decay.

14. The method as described in claim 13, wherein said step of determining said time period needed for neutron count decay includes a time period needed for decay of epithermal neutrons.

15. The method as described in claim 7, wherein said step of acquiring a ratio of neutron detector count rates includes:

generating a near-to-array ratio wherein said near-to-array ratio is a ratio of data acquired from said near spacing, to data acquired from said intermediate spacing, and transforming said near-to-array ratio to an apparent porosity; and generating a near-to-far ratio wherein said near-to-far ratio is a ratio of data acquired from said near spacing, to data acquired from said far spacing, and transforming said near-to-far ratio to an apparent porosity.

16. The method as described in claim 7, wherein said step of calculating timing measurement includes computing a neutron slowing-down time and transforming said slowing-down time into an apparent porosity.

17. The method as described in claim 16, wherein said step of calculating said neutron slowing-down time includes measuring a neutron count rate decay for a pre-selected period of time immediately proceeding said neutron pulse.

18. The method as described in claim 17, wherein said pre-selected period of time is about 30 microseconds.

19. The method as described in claim 7, wherein said step of computing cement annulus includes using inputs from said database to perform weighted multiple linear regression on nearby database values.

20. The method as described in claim 7, wherein said step of performing correction for said cement annulus and other borehole variables, includes using inputs from said database to perform weighted multiple linear regression on nearby database values.

21. An apparatus for acquiring data relating to well characteristics and geological formations comprising:

a housing;

a neutron source located in said housing and adapted to deliver neutrons into an area adjacent said well;

means for generating neutron pulses through said neutron source;

a first epithermal neutron sensor located in said housing and spaced from said neutron source;

means for acquiring a far neutron count rate through said first epithermal neutron sensor;

a second epithermal neutron sensor located in said housing, spaced from said neutron source and intermediate said neutron source and said first epithermal neutron sensor;

means for acquiring a near neutron count rate through said second epithermal neutron sensor;

a third epithermal neutron sensor located in said housing intermediate said first and second epithermal neutron sensors;

means for acquiring an array neutron count rate through said third epithermal neutron sensor;

means for receiving electrical signals from said first, second, and third epithermal neutron sensors indicative of the number of neutrons detected by said sensors;

means for acquiring a timing measurement from at least one of said near neutron sensor, array neutron sensor, and far neutron sensor to measure a first depth of investigation;

means for acquiring at least one of a ratio of said near neutron count rate to said array neutron count rate and ratio of said near neutron count rate to said far neutron count rate, to measure a second depth of investigation;

means for calculating a porosity of said area adjacent said well using at least one of said timing measurements and at least one of said ratio of said near neutron count rate to said array neutron count rate, and ratio of said near neutron count rate to said far neutron count rate.

22. The apparatus as described in claim 21, wherein said pulses emitted by said neutron source are about 10 microseconds long.

23. The apparatus as described in claim 21, including means for focusing said first and third epithermal neutron sensors in a predetermined direction.

24. The apparatus as described in claim 21, wherein said third epithermal neutron sensor includes a plurality of detectors arranged in an array.

25. An apparatus for acquiring data relating to well characteristics and geological formations, comprising:

means for generating neutron pulses that release neutrons into a first region and the geological formation surrounding said first region;

means for sensing neutrons and acquiring a plurality of neutron detector count rates using at least two neutron source to neutron detector spacings;

means for acquiring a timing measurement at one of said spacings to measure a first depth of investigation;

means for acquiring a ratio of said neutron detector count rates to measure a second depth of investigation;

means for calculating an apparent porosity using said timing measurement and said ratios of neutron count rates;

means for determining the effect of said first region on said calculated apparent porosity in response to at least one of said ratio of neutron detector count rates and said timing measurement;

means for calculating a formation porosity by performing correction to said apparent porosity for the determined effect of said first region.

26. The apparatus described in claim 24, further comprising means for correcting said apparent formation porosity for environmental factors.

* * * * *